(12) United States Patent
Jolivet et al.

(10) Patent No.: US 8,699,946 B2
(45) Date of Patent: Apr. 15, 2014

(54) CONTACTLESS RECHARGING OF MOBILE TERMINAL BATTERY

(75) Inventors: Paul Jolivet, Paris (FR); Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 12/521,486

(22) PCT Filed: Jan. 25, 2008

(86) PCT No.: PCT/KR2008/000485
§ 371 (c)(1),
(2), (4) Date: Jun. 26, 2009

(87) PCT Pub. No.: WO2008/091138
PCT Pub. Date: Jul. 31, 2008

(65) Prior Publication Data
US 2010/0048255 A1 Feb. 25, 2010

Related U.S. Application Data

(60) Provisional application No. 60/886,896, filed on Jan. 26, 2007.

(51) Int. Cl.
*H04B 5/00* (2006.01)
(52) U.S. Cl.
USPC ............... 455/41.1; 340/10.1; 340/10.34
(58) Field of Classification Search
USPC ........ 455/573, 41.1–41.3, 558; 320/108, 114, 320/115, 106; 340/10.1–10.4, 572.1, 572.7; 235/385
See application file for complete search history.

(56) References Cited

U.S. PATENT DOCUMENTS

| | | | |
|---|---|---|---|
| 6,127,799 A | 10/2000 | Krishnan | |
| 6,184,651 B1 * | 2/2001 | Fernandez et al. | 320/108 |
| 6,294,997 B1 * | 9/2001 | Paratore et al. | 340/572.1 |
| 7,893,816 B1 * | 2/2011 | Kwan | 340/10.34 |
| 2002/0040936 A1 | 4/2002 | Wentker et al. | |
| 2005/0134213 A1 * | 6/2005 | Takagi et al. | 320/108 |
| 2005/0216344 A1 * | 9/2005 | Collet et al. | 705/14 |
| 2005/0259673 A1 | 11/2005 | Lu et al. | |
| 2006/0079284 A1 | 4/2006 | Lu et al. | |
| 2006/0111053 A1 * | 5/2006 | Wu et al. | 455/90.3 |
| 2006/0114102 A1 * | 6/2006 | Chang et al. | 340/10.1 |

(Continued)

FOREIGN PATENT DOCUMENTS

| | | |
|---|---|---|
| GB | 2 422 517 A | 7/2006 |
| KR | 10-2005-0035788 A | 4/2005 |

(Continued)

OTHER PUBLICATIONS

Liu X., et al., "Finite Element Simulation of a Universal Contactless Battery Charging Platform" Hanyang University, IEEE, 2005, pp. 1927-1932.

*Primary Examiner* — Edward Urban
*Assistant Examiner* — Golam Sorowar
(74) *Attorney, Agent, or Firm* — Birch, Stewart, Kolasch & Birch, LLP

(57) ABSTRACT

A mobile terminal has a contactless function module that is used to perform a contactless transaction and also used to perform battery recharging. The mobile terminal has a power source operatively connected with the contactless function module and adapted to be recharged by induced current created by electromagnetic fields detected by the contactless function module.

9 Claims, 4 Drawing Sheets

(56) References Cited

U.S. PATENT DOCUMENTS

| | | |
|---|---|---|
| 2006/0206710 A1 | 9/2006 | Gehrmann |
| 2007/0005989 A1 | 1/2007 | Conrado et al. |
| 2007/0145135 A1 | 6/2007 | Jogand-Coulomb et al. |
| 2007/0178938 A1 | 8/2007 | Kravitz et al. |
| 2007/0222602 A1* | 9/2007 | Luo et al. ............ 340/572.7 |
| 2007/0293155 A1 | 12/2007 | Liao et al. |
| 2008/0073426 A1 | 3/2008 | Koh et al. |
| 2008/0116264 A1 | 5/2008 | Hammad et al. |
| 2008/0162357 A1 | 7/2008 | Gerardi et al. |
| 2009/0255988 A1 | 10/2009 | Di Luoffo et al. |
| 2010/0227588 A1 | 9/2010 | Bradley |
| 2010/0288839 A1 | 11/2010 | Adams et al. |

FOREIGN PATENT DOCUMENTS

| | | |
|---|---|---|
| KR | 10-2006-0002325 A | 1/2006 |
| WO | WO 03/084124 A1 | 10/2003 |
| WO | WO-2008/091138 A1 | 7/2008 |

\* cited by examiner

| # | Assignment | # | Assignment |
|---|---|---|---|
| C1 | VCC | C5 | GND |
| C2 | RST | C6 | VPP |
| C3 | CLK | C7 | I/O |
| C4 | | C8 | |

CONTACTLESS RECHARGING OF MOBILE TERMINAL BATTERY

This application is the National Phase of PCT/KR2008/000485 filed on Jan. 25, 2008, which claims priority under 35 U.S.C. 119(e) to U.S. Provisional Application No. 60/886,896 filed on Jan. 26, 2007, all of which are hereby incorporated by reference into the present application.

TECHNICAL FIELD

The present invention relates performing contactless recharging of a mobile terminal battery.

BACKGROUND ART

The background art technologies related to mobile terminals do not sufficiently address the issues related to performing contactless recharging of a mobile terminal battery, and thus do not offer appropriate solutions.

DISCLOSURE OF INVENTION

Technical Solution

The present inventor recognized some drawbacks of the background art. Based upon such recognition, the various features described hereafter have been conceived such that contactless recharging of a mobile terminal battery can be performed.

The contactless recharging of a mobile terminal battery is performed by detecting electromagnetic fields near the mobile terminal and inducing current therefrom to be used in recharging the battery of the mobile terminal.

MODE FOR THE INVENTION

Figure 1:
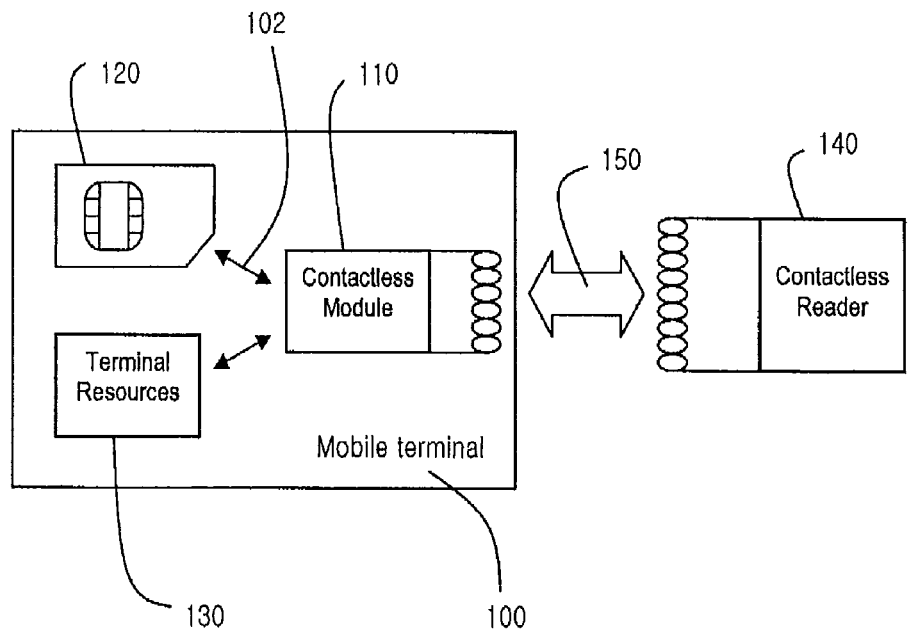
FIG. 1 shows an example of how a mobile terminal and a contactless reader can cooperate with each other.

The present disclosure claims priority benefit to U.S. Provisional Application No. 60/886,896 (filed Jan. 26, 2007), which contents are all incorporated by reference herein.

The inventive concepts and features described herein that are related to contactless recharging of a battery (or other power supply, power source, etc.) will be explained in terms of implementation for a user terminal, such as a mobile phone. However, such details are not meant to limit the various features described herein, which are applicable to other types of devices.

Hereafter, the term "terminal" will be used to refer to various types of user devices, such as mobile communication terminals, user equipment (UE), mobile equipment (ME), and other devices that support various types of wireless communication technologies.

The definitions of some other terms used herein are provided as follows:

CLF: ContactLess Function (module)
ICC: Integrated Circuit Card (smart card)
ISO: International Standard Organisation.
ETSI: European Telecommunication Standard Institute (that is in charge of the UICC specification).
MMC: MultiMedia Card as defined by the MMC Association (By extension, the protocol can be defined on the card/reader interface).
UICC: Smart card platform supporting SIM, USIM, and other applications.
USB: Universal Serial Bus as defined by the USB Implementers'Forum (By extension, the protocol can be defined on the card/reader interface).
USIM: Universal SIM, UICC application including parameters and tools to identify and authenticate a 3G/UMTS user and to run its applications.
SIM: Subscriber Identity Module, UICC application including parameters and tools to identify and authenticate a GSM user and to run its applications.

The present invention relates to contactless recharging of a battery (or other power supply, power source, etc.) used for a mobile terminal or the like.

It should be noted that mobile terminals under development (or to be developed in the near future) may have multiple card slots to receive more than one smart card. Also, the contactless function module (CLF) itself may removable by being implemented on a smart card or the like.

As the concepts and aspects described herein are applicable to smart cards (or other types of storage media and memories), various standards that are related to and support such smart card technologies (such as ISO/IEC, ETSI, GSM, 3GPP, 3GPP2, OMA, IEEE, etc.) are also part of the exemplary embodiments described herein. It can be understood that the above exemplary standards are not intended to be limiting, as other related standards and technologies would also be applicable to the various features and concepts described herein.

For example, a smart card can be considered to have a basic platform and various applications related thereto. The standardization to support the basic platform is handled by the ETSI, while the various applications are handled by different standard organizations. For example, the USIM and SIM features are handled by the 3GPP, the RUIM features is handled by the 3GPP2, certain financial applications are handled by EMV (Europay™, MasterCard™, Visa™), and the like.

A smart card (also referred to as a chip card, an integrated circuit card (ICC) or the like) is defined as any pocket-sized card with embedded integrated circuits that can process information. Various ICC applications can be used to receive inputs, perform processing thereon, and deliver outputs. There are two types of ICCs, namely memory cards and microprocessor cards. Memory cards contain non-volatile memory storage components, and some logic circuitry for security. Microprocessor cards contain volatile memory and microprocessor components. Such cards may be made of plastic or some other appropriate material and may have an embedded hologram or other security device to avoid counterfeiting.

Smart cards may be categorized as having a contact interface, a contactless interface, or both. These smart cards typically do not have their own battery or power source.

A contact-type smart card has a small chip (typically made of gold) that makes physical contact with electrical connectors of a smart card reader upon insertion of the smart card, such that information can be read from and written to the chip.

A contactless-type smart card communicates with a card reader through radio frequency identification (RFID) induction technology. Such contactless-type smart cards may also use near field communication (NFC), which is a short-range wireless communication technology that allows data exchanging between devices over a relatively short distance. NFC technology is based on RFID, which makes it compatible with the existing contactless infrastructure already in use for public transportation and payment applications. Also, in a contactless-type smart card, an inductor element can be used to capture and rectify incident RF signals in order to power the integrated circuits in the smart card.

A dual-interface card, namely, a smart card implemented with contactless and contact interfaces, may use shared storage and processing.

The term "contactless" may be used in reference to certain technologies, such as a contactless smart card, a proximity card, contactless payment, radio-frequency identification (RFID), near field communication (NFC), and the like.

The current standard for contactless smart card communications is ISO/IEC 14443 that defines two types of contactless cards (Types A and B) and allows for contactless communications at a distance of up to about 10 centimeters.

To provide enhanced services and applications, more and more terminals will implement to so-called contactless features. Such enhanced services can support transportation applications (e.g., fare payments for riding the subway, metro, buses, etc.), e-purses (e.g., electronic financial transactions, e-banking, etc.), and the like.

The principle of the contactless feature is that a relatively low range medium is used between the terminal and a reader (for instance, a metro/subway turnstile or gate) to execute a fee transaction, to identify the user, or to perform some other type of function or application.

For security and service management reasons, it is likely that the UICC (the telecommunication smart card supporting SIM/USIM) will manage at least part of the contactless services/applications, therefore implementations must consider a physical or logical interface with the UICC.

For technical reasons (such as, electromagnetic constraints (EMC), antenna implementation, etc.), it is impossible (or at least very difficult) to implement all (or the desired or necessary) contactless features in the smart card (UICC). At least part of such features shall be supported in a contactless function module (i.e., a functional entity implemented in hardware, software, or a combination thereof to support contactless services and/or applications), which is part of the terminal.

Also, the contactless feature is related to a battery off operation mode that involves power induction via electromagnetic fields.

On top of the use for contactless services (inc. transportation, access control), this new interface enables the induction of current to the mobile handset. This induction current is designed for operating small (i.e., low power) hardware elements, however the system technical specifications authorizes currents levels that may allow power supply for new applications, based on this implemented service.

The principle of this invention is to use the inducted current, when enough power is available and whether contactless module is operational or not for contactless transaction, to recharge the mobile handset battery.

FIG. 1 shows an example of how a mobile terminal and a contactless reader can cooperate with each other. The mobile terminal 100 has a contactless module 110 that interacts with a smart card 120 and with various terminal resources 130. When the mobile terminal 100 is placed at or near a contactless reader 140, wireless communications can be performed with the contactless module 110 via a wireless (or contactless) interface 150.

As an example of a smart card 120, the UICC is a smart card platform that supports various telecommunication applications, such as SIM (for GSM) or USIM (for 3G). The UICC can also support other types of applications. The UICC is the evolution of the GSM SIM card that was only able to run SIM applications.

The UICC continues to evolve with respect to two aspects; 1) employing a large memory and high-speed interface, and 2) supporting contactless services.

A large memory and high-speed interface allow the UICC to support more applications, personal data of the user, certificate procedures, etc. without having trouble in transferring large amounts of data within a reasonable timeframe.

Contactless services address the market of integrating access control services, transportation passes, and the like into the mobile terminal. The UICC would be used in such cases to secure information and applications, whereas for reasons detailed below, most of the actual contactless link management (modulation, power control and management, etc.) would be made in the mobile terminal.

The UICC is the smart card platform that supports the telecommunication applications such as SIM (for GSM) or USIM (for 3G). It can also support other applications, including transportation application based on the contactless interface. It is the evolution of the GSM SIM card that was only able to run the SIM application.

The principle of the contactless interface applied to UICC is that UICC will pilot a separate terminal based module that will manage the contactless transaction. This is likely to be piloted by the UICC for security reasons, the Operator and 3rd party provider usually preferring UICC to Terminal.

Figure 2:
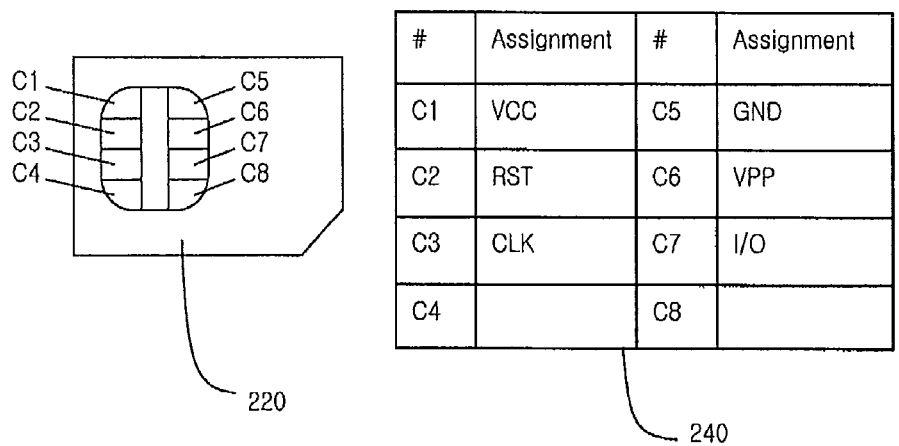
FIG. 2 shows an example of a smart card (UICC) 220 having a particular allocation for eight (8) physical contacts, as indicated by the chart 240.

FIG. 2 shows an example of a smart card (UICC) 220 having a particular allocation for eight (8) physical contacts, as indicated by the chart 240.

Although it can be understood that the features of the present invention can also be adapted and implemented to smart cards with a different number of physical contacts, the exemplary embodiments will focus on an 8-contact type UICC.

The physical interface between the UICC and mobile terminal can be based on an 8-contact module. It is currently unlikely that more contacts can be implemented in the future. Therefore, all extensions have to be considered based on the existing contacts, and minimum backward compatibility requirements, such that a session can be always opened on the ISO T=0 protocol, as defined in the ISO 7816 series.

Therefore, only 3 contacts are remaining for further development. Currently, 2 contact candidates are considered for a High-Speed interface between the UICC and the terminal. Additionally, MMC can be implemented by using the C4/C6/C8 contacts, and USB can be implemented by using the C4/C8 contacts. It may be likely that the interface with the contactless module in the terminal is likely to be specified based on the Single Wired Protocol, using contact C6.

Figure 3:
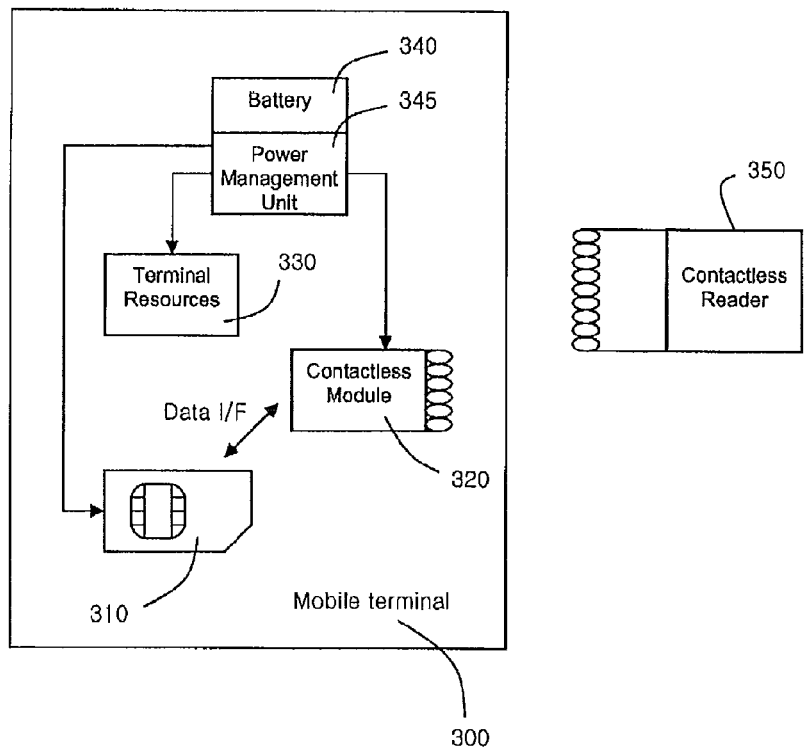
FIG. 3 shows an example of how a secure element (smart card) and a contactless module are powered in a mobile terminal via a battery.

FIG. 3 shows an example of how a secure element (smart card) and a contactless module are powered in a mobile terminal via a battery A mobile terminal 300 and a contactless reader 350 can cooperate through near-field communications (NFC) or other close-range wireless (contactless) technology to carry out a contactless application or function, such as a financial transaction, a transportation pass, user identification, or the like.

The mobile terminal 300 may include a secure element 310 (such as, a smart card, a UICC, etc.) and a contactless module 320 (such as, a contactless function module (CLF), etc.), which can communicate (i.e., exchange data and information) with each other (and with other components in the mobile terminal 300) via a communication medium or interface (wired or wireless). Such communication medium can support the exchange of protocol commands and instructions (such as those specified by the ISO or some wireless protocol standard).

As explained previously, the contactless hardware is independent from the UICC, although it could interact with the module through the terminal communication bus and logical links. Note that although FIG. 3 relates to a terminal in a contactless card emulation mode, it also applies when the mobile contactless function is used as a reader.

As shown in FIG. 3, in the normal mode (i.e. power is supplied by the mobile handset), the secure element 310 (UICC) and the contactless module 320 are powered by the terminal via a battery 340 (or other power source). A power management unit 345 (or other power control means) performs the appropriate power control to access and/or operate the secure element 310, the contactless module 320, and other terminal resources 330. This allows use of all or most functionalities of the terminal.

When considering the case of the battery off mode (e.g., the terminal is switched off, the battery is empty, etc.), some services should still be served, for instance, an access pass function for transportation applications. The so-called Single Wire Protocol (SWP) is one type of contactless technology proposal that considers the battery off mode situation and employs current induction techniques. However, working in the battery off mode is a strong requirement that is requested from mobile communication system operators. In this mode, the terminal resources cannot be sufficiently used, because the induced current is usually too low (i.e., not strong enough) to enable a plurality of terminal functions, and if enablement is possible, the quality of service (QoS) requirements cannot be fully satisfied.

Figure 4:
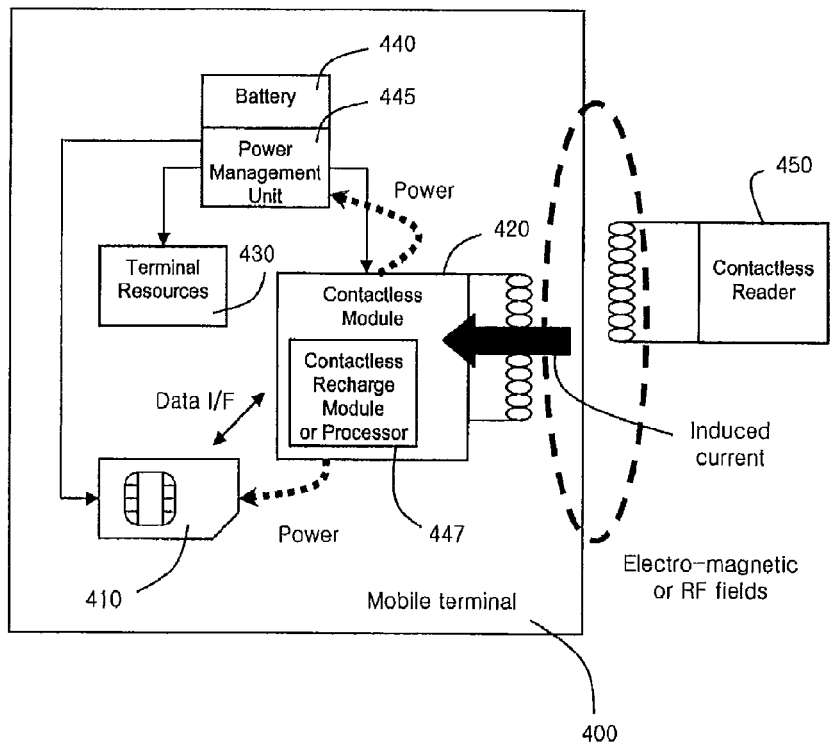
FIG. 4 shows an example of how a secure element (smart card) and a contactless module are powered in a mobile terminal via contactless recharging due to induced current from electromagnetic fields near the mobile terminal.

FIG. 4 shows an example of how a secure element (smart card) and a contactless module are powered in a mobile terminal via contactless recharging due to induced current from electromagnetic fields near the mobile terminal.

Similar to FIG. 3, the secure element 410 (UICC) and the contactless module 420 are normally powered by the terminal via a battery 440 (or other power source). A power management unit 445 (or other power control means) performs the appropriate power control to access and/or operate the secure element 410, the contactless module 420, and other terminal resources 430.

However, it would be very useful to be able to recharge the mobile handset battery anywhere without caring about the compatibility of chargers plugs or the user having to carry around a charger device or electrical cords. As such, attempts to implement a new type of interface, namely a contactless interface, is being applied to mobile terminals. Such contactless interface enables power generation by induction. When enough energy is available through electromagnetic fields detected near the terminal, it becomes easier to offer the service of recharging battery at low cost while having low detrimental impact for implementation in the mobile handset architecture.

The concept of the present invention is to reuse the induced current when there is enough power in order to recharge the battery. However, it is unlikely that this current will allow the use of the terminal itself with quality of service being guaranteed.

According to the basic principles of this invention, when the terminal is in an area (or region) having a strong enough electromagnetic field (which does not correspond to or interfere with a contactless transaction to be initiated), the terminal uses the field to create an induced current to be used in recharging the battery. This can be based on an automatic detection as well as through user interaction.

In the reader mode, certain implementations are based on electromagnetic field generation of up to about 3 W.

A contactless recharge module or processor 447 (or some equivalent hardware device) may be employed. Such contactless recharge module 447 may part of the contactless module 420 itself or may be a separate (dedicated) element.

Here, the contactless recharge module or processor 447 may have a detector (or the like) detect the presence of electromagnetic fields near the mobile terminal, and may have a generator (or the like) to generate an induced current from the detected electromagnetic fields.

It should be noted that the battery of the mobile terminal itself may be recharged or another small separate (or dedicated) power source (in addition to the mobile terminal battery) may be recharged. In addition to battery recharging using the induced current from the electromagnetic fields, other types of power (such as potential energy generated while the user carries around his mobile terminal) may be additionally used for the recharging operation.

Figure 5:
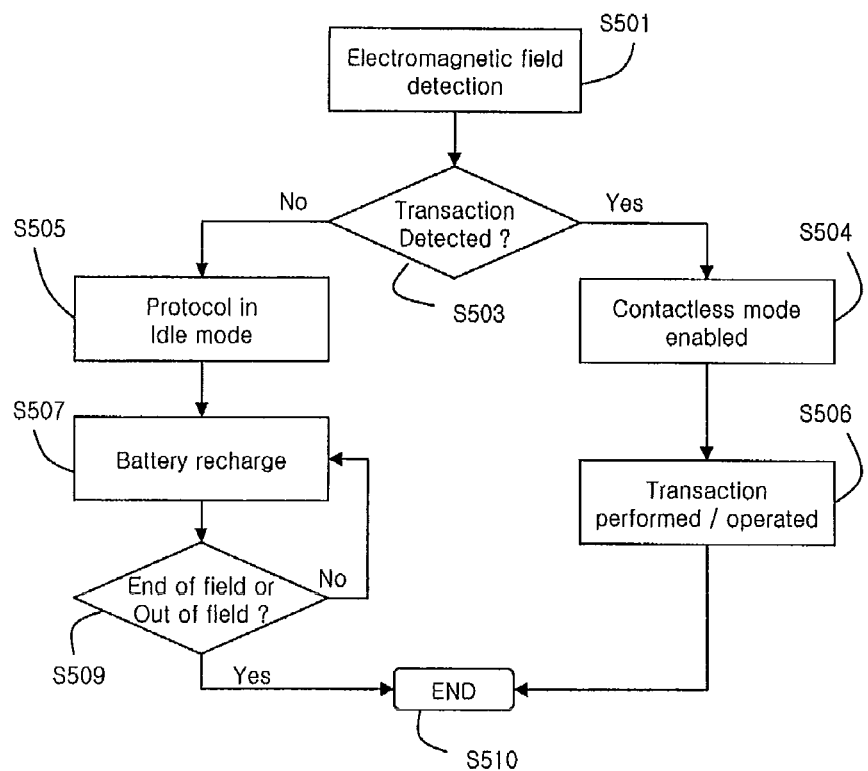
FIG. 5 is a flow chart showing the exemplary procedures for contactless recharging of the battery according to the present invention.

FIG. 5 shows a flow chart for explaining the general principles of the present invention.

This first approach is based on the following assumptions that (1) terminal is powered and switched on, (2) the contactless module checks for a electromagnetic field, (3) the system is developed to automatically enable battery recharging when no transaction is requested by the contactless reader, and (4) the system is developed to automatically enable battery recharge when there is a transaction requested by the contactless reader and if there is enough power to charge the battery.

With reference to FIGS. 4 and 5, the exemplary procedures for contactless recharging of the battery according to the present invention will be explained in more detail.

First, the presence of an electric field is detected (S501). This may be performed by the contactless module 420 and/or the contactless recharge module (or processor) 447 in the mobile terminal 400.

Also, detection of a transaction request (such as a transportation access request, financial payment, etc.) is performed (S503). This can be performed by the contactless module 420 that cooperates with a contactless reader 450. Such transaction request may be generated from the contactless reader 450 of from the mobile terminal itself.

As a result, if a transaction request is detected, then the contactless mode of the mobile terminal is enabled (S504). Then, the actual transaction is performed or operated (S506) by cooperation between the contactless module 420, the smart card 410, the terminal resources 430 and the like. Thereafter, the procedure ends (S510).

If a transaction is not detected at step S503, the protocol is set (or remains) as idle mode (S505). As such, the detected electromagnetic fields can induce a current to be employed in recharging the battery (S507). This can be performed by the contactless recharge module or processor 447 (and/or the contactless module 420), the power management unit 445 and the batter 440.

Here, is can be understood that various types of current inducement techniques may be employed to achieve the present invention. Also, it can be understood that the mobile terminal needs to be physically located near or within the range of the detected magnetic fields such that sufficient current inducement can be performed.

During the recharging, the electromagnetic field detection is continued (S509). Here, such detection may be performed in a continuous or non-continuous manner. Such non-continuous detection may be done in a periodic manner, upon user request, upon occurrence of certain events, or on the basis of some other condition or circumstance.

If the mobile terminal fails to detect the electromagnetic field (such as if the user with his mobile terminal walks away, if there is some interference, if electromagnetic field generation is stopped for some reason, etc.), then this procedure ends (S510).

This procedure can also easily be enhanced to offer a better service with little impact on both the architecture of the contactless module and the mobile handset in general.

Figure 6:
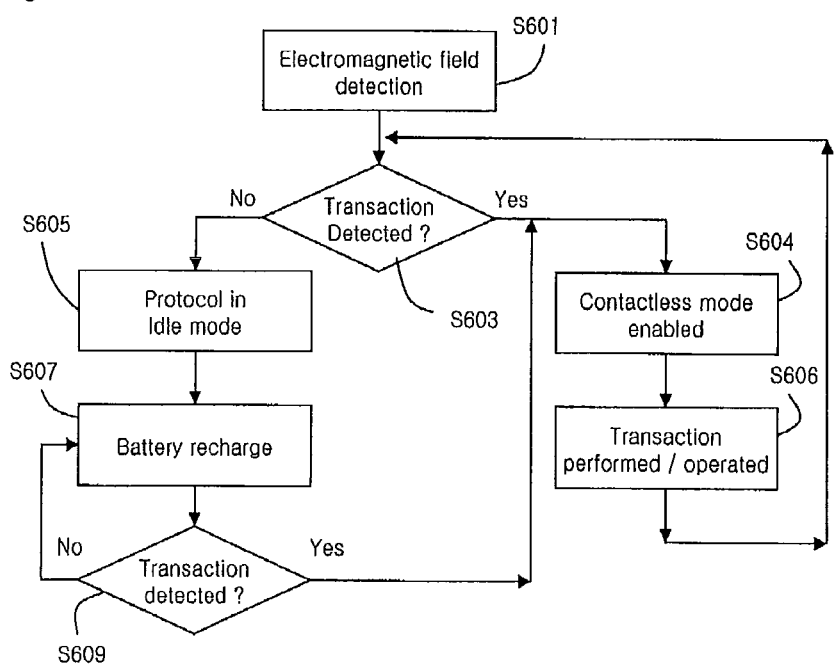
FIG. 6 is a flow chart showing alternative exemplary procedures for contactless recharging of the battery according to the present invention.

FIG. 6 shows a first enhancement that adds, to the general procedure, a scheduled check of an ongoing transaction through the electromagnetic field. This can help in the case where no transaction is required at the moment when the terminal enters the field, however later on, this situation changes. This could happen for instance in the case where the user is recharging his phone close to a point of sale terminal in a shop and after 15 minutes wants to make a payment with his phone. In the general approach as described above, one possible way of doing so would be to get the terminal out of the field and get move back into the field again to initiate a new transaction.

First, the presence of an electric field is detected (S601). Also, detection of a transaction request is performed (S603). If a transaction request is detected, then the contactless mode of the mobile terminal is enabled (S604). Then, the actual transaction is performed or operated (S606), Afterwards, the procedure returns to step S603 to detect any further transactions, and the process may be repeated.

If a transaction is not detected at step S603, the protocol is set (or remains) as idle mode (S605). As such, the detected electromagnetic fields can induce a current to be employed in recharging the battery (S607). Then, the detection of any further transactions is performed (S609). If any further transaction is detected, the process returns to step S603 for repetition, if needed. If no further transactions are detected at step S609, then the process returns to step S607 to continue the battery recharge procedure.

Figure 7:
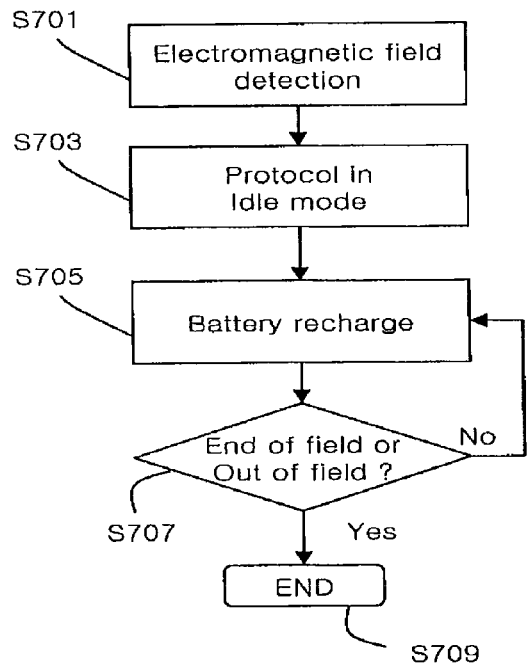
FIG. 7 is a flow chart showing some other exemplary procedures for contactless recharging of the battery according to the present invention.

FIG. 7 shows a second enhancement that includes the possibility for the situation for the user (knowing that his mobile phone battery is too low) to decide to ignore any transaction (even though some transactions could be operated in the battery off mode).

Two solutions are foreseen to implement this enhancement: (1) such procedure may be part of the contactless module parameters that can be setup by the user (which has to be done before the battery is empty), or (2) such procedure is done using a physical switch that can be activated or accessible when the mobile is turned off.

Upon detection of an electromagnetic field (S701), the mobile terminal will set its protocol to be in idle mode (S703), and thus the batter recharge operation can be performed (S705). The electromagnetic field detection continues (S707) such that battery recharging can continue if electromagnetic fields are detected or otherwise, the process can end (S709).

From the technical implementation point of view, this implies few changes in the architecture of the contactless module, including the possibility to return the power connection, i.e. to enable the possibility that the contactless module powers the Power Management Unit.

The power induced is then considered as the power supplied through the charger and allows the battery to be recharged.

As for some examples of practical implementation (i.e., use cases), the following two may be considered:

(1) The mobile handset is left in the area of a contactless reader (e.g., a metro gateway, a point-of-sale (PoS) terminal, etc.) without using any related service. The battery can be recharged during the time spent in this area.

(2) A shop can offer as a service to its customer the recharge of their mobile handset battery by using its point of sale terminal at the only cost of the energy required for operating this terminal.

Figure 8:
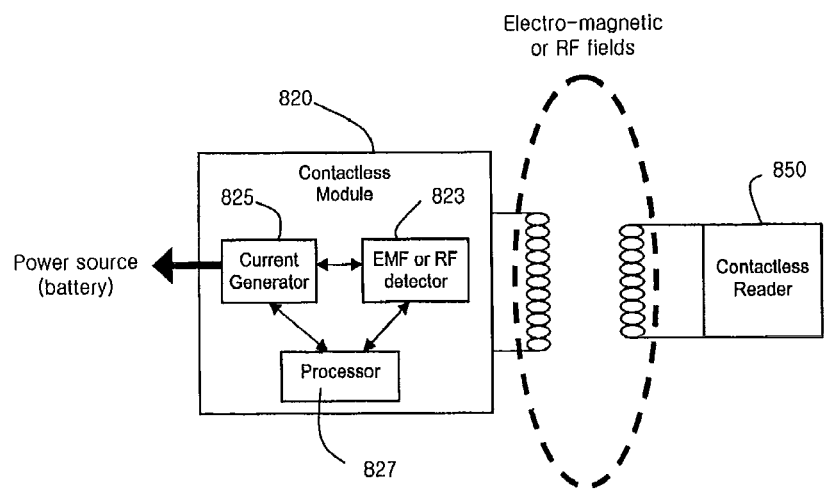
FIG. 8 shows an exemplary structure of a contactless module with various components that operate with an external contactless reader.

FIG. 8 shows an exemplary structure of a contactless module with various components that operate with an external contactless reader.

The contactless module 820 may be comprised of an electromagnetic field (EMF) or radio frequency (RF) detector 823 (or similar element), a current generator 825 (or similar element), and a processor 827 that provides control and cooperates with the detector 823 and the generator 825. The electromagnetic fields or RF field from a contactless reader 850 are detected by the EMF or RF detector 823, which in turn cooperates with the current generator 825 to provide output to a power source (battery) for recharging thereof.

As described thus far, the concepts and features related to contactless recharge of a mobile terminal battery can also be summed up as follows.

In a device that can support so-called contactless functions and applications, a contactless function (CLF) module can be powered by both the mobile terminal battery as well as another power source, such as the current induced from electromagnetic fields detected in proximity to the mobile terminal.

Thus, it can be said that the CLF module of the present invention can serve two different purposes. Namely, the CLF module is employed for performing various contactless transactions, and also is employed for recharging the mobile terminal battery. Here, these two functions can have a different priority, in that supporting contactless transactions may have high priority, while recharging can have a lower priority. In other words, when terminal is not powered and a RF field is detected by CLF module, the smart card (UICC) shall be activated if no transaction is detected; then the CLF module transfers power inducted by the RF field to the battery for recharging. Thus, the CLF module of the present invention has a dual purpose: handle transactions (as high priority) and recharge the battery (as low priority).

The present invention provides a method of recharging a battery through a contactless function (CLF) module of a mobile terminal, comprising: checking, by the CLF module, a power supply for the mobile terminal; detecting, by the CLF, a radio frequency (RF) field when no power supply is detected by the checking step; activating a secure element to detect whether any transaction is requested; and transferring the power inducted by the radio frequency (RF) field to the battery for recharging when no transaction is ongoing.

Here, the power supply is from a battery. The radio frequency (RF) field provides electromagnetic energy for inducing current used for the power. The secure element is a smart card. The transaction is related to a contactless service or contactless function.

Also, the present invention provides a method of controlling a wireless function module of a mobile terminal, comprising: detecting an electromagnetic field; and performing at least one of a transaction with another terminal using the detected electromagnetic field and battery recharging as a lower priority compared with the transaction.

Here, the detected electromagnetic field is used to induce current for the battery recharging. The detecting is performed periodically or non-periodically. The transaction is related to at least one of a contactless service, a wirelessly activated function, or a user application employing near-field communication (NFC) techniques. Here, only the transaction is performed if the detected electromagnetic field is insufficient for performing both the transaction and the battery recharging. Alternatively, only the battery recharging is performed if the detected electromagnetic field is insufficient for performing the transaction.

Additionally, the present invention provides a method of controlling a wireless function module, comprising: detecting whether electromagnetic fields are present; performing both battery recharging and transactions with another device, if the detected electromagnetic fields are sufficient to support both operations; and performing battery recharging as a lower priority compared with the transactions that are a higher priority, if the detected electromagnetic fields are insufficient to support the transactions.

Here, the electromagnetic field is associated with radio frequency signals. The transactions are related to at least one of a contactless service, a wirelessly activated function, or a user application employing near-field communication (NFC) techniques. The detected electromagnetic fields induce a current that is used for the battery recharging.

Furthermore, the present invention provides a mobile terminal comprising: a contactless function module that is used to perform a contactless transaction and also used to perform battery recharging; and a power source operatively connected with the contactless function module and adapted to be recharged by induced current created by electromagnetic fields detected by the contactless function module.

Here, the contactless function module comprises: a detector that detects the presence of electromagnetic fields; a generator that generates current upon induction from the detected electromagnetic fields; and a processor that cooperates with and provide control to the detector and the generator in order to provide the generated current to the power source for recharging thereof. The detector performs detection in a periodic or non-periodic manner. The power source supplies power for accessing a smart card of the mobile terminal. The contactless transaction is related to at least one of a financial payment, transportation access, or other user application employing near-field communication (NFC) techniques.

INDUSTRIAL APPLICABILITY

The features and concepts herein are applicable to and can be implemented for various types of user devices (e.g., mobile terminals, handsets, wireless communication devices, etc.) and/or entities that can support different types of air interfaces, protocols, and applications used in wireless communications.

The described contactless recharging of a mobile terminal battery can be used in a wide variety of fields, such as financial applications (e.g., credit cards, ATM cards, fuel cards, SIM cards for mobile phones, public transportation passes, etc.), identification applications (e.g., personal electronic ID cards, medical ID cards, etc.), security applications (e.g., biometric passports, cryptographic pass cards, employee badges, etc.), and the like.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of charging a battery by a contactless unit of a mobile terminal, the method performed by the contactless unit and comprising:
   detecting a radio frequency (RF) field;
   detecting whether a transaction is requested from a secure element, wherein the secure element is included in the mobile terminal;
   determining an operation mode of the battery of the mobile terminal between a normal mode and a limit service mode according to a charging state of the battery of the mobile terminal, wherein the normal mode indicates that the battery of the mobile terminal provides power to the secure element and the contactless module and the limit service mode indicates that the mobile terminal provides a part of services of the normal mode;
   transferring the power induced by the RF field to the battery of the mobile terminal when the transaction from the secure element is not requested and the operation mode is the limit service mode;
   transferring the power induced by the RF field to the secure element when the transaction from the secure element is requested and the operation mode is the limit service mode; and
   transferring the power to the battery of the mobile terminal when the transaction from the secure element is requested and the operation mode is the normal mode.

2. The method of claim 1, wherein the RF field provides electromagnetic energy for inducing current used for the power.

3. The method of claim 1, wherein the transaction is related to a contactless service or contactless function.

4. The method of claim 1, wherein the secure element is a smart card.

5. A mobile terminal comprising:
   a contactless unit that is used to perform a contactless transaction and a power source charging operation;
   a battery connected with the contactless unit; and
   a secure element configured to store data and to be accessed through the contactless unit, wherein the contactless unit is configured to:
   detect a radio frequency (RF) field;
   detect whether a transaction is requested from a secure element, wherein the secure element is included in the mobile terminal;

determine an operation mode of the battery of the mobile terminal between a normal mode and a limit service mode according to a charging state of the battery of the mobile terminal, wherein the normal mode indicates that the battery of the mobile terminal provides power to the secure element and the contactless module and the limit service mode indicates that the mobile terminal provides a part of services of the normal mode;

transfer the power induced by the RF field to the battery of the mobile terminal when the transaction from the secure element is not requested and the operation mode is the limit service mode;

transfer the power induced by the RF field to the secure element when the transaction from the secure element is requested and the operation mode is the limit service mode; and transfer the power to the battery of the mobile terminal when the transaction from the secure element is requested and the operation mode is the normal mode.

6. The terminal of claim 5, wherein the contactless unit comprises:
- a detector that detects a presence of the electromagnetic fields;
- a generator that generates current upon induction from the detected electromagnetic fields; and
- a processor that cooperates with and provides control to the detector and the generator in order to provide the generated current to the power source for charging the power source.

7. The terminal of claim 6, wherein the detector performs detection in a periodic or non-periodic manner.

8. The terminal of claim 5, wherein the contactless transaction is related to at least one of a financial payment, transportation access, or other user application employing near-field communication (NFC) techniques.

9. The mobile terminal of claim 5, wherein the secure element is a smart card.

* * * * *